US006694082B2

United States Patent
Hwang et al.

(10) Patent No.: US 6,694,082 B2
(45) Date of Patent: Feb. 17, 2004

(54) POLYCRYSTALLINE FERROELECTRIC OPTICAL DEVICES

(75) Inventors: Harold Yoonsung Hwang, Jersey City, NJ (US); Markus J P Siegert, Cologne (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/826,528

(22) Filed: Apr. 5, 2001

(65) Prior Publication Data

US 2002/0172487 A1 Nov. 21, 2002

(51) Int. Cl.⁷ .................................................. G02B 6/10
(52) U.S. Cl. ................................ 385/129; 385/2; 385/8
(58) Field of Search ............................... 385/2, 8, 9, 14, 385/31, 129, 130, 131

(56) References Cited

U.S. PATENT DOCUMENTS

| 5,342,648 A | * | 8/1994 | MacKenzie et al. | 427/126.3 |
| 6,066,581 A | * | 5/2000 | Chivukula et al. | 501/12 |
| 6,069,729 A | * | 5/2000 | Gill et al. | 359/245 |
| 6,103,008 A | | 8/2000 | McKee et al. | |
| 6,118,571 A | * | 9/2000 | Wessels et al. | 359/245 |

FOREIGN PATENT DOCUMENTS

WO          9922266       5/1999      ............ G02F/1/03

OTHER PUBLICATIONS

Zgonik et al., *Dielectric, elastic . . . of BaTiO₃ crystals*, Phys. Rev. B, vol. 50, pp. 5941–5949 (Sep. 1994).
Beckers et al., *Structural and optical . . .*, J. Appl. Phys., vol. 83, No. 6, pp. 3305–3310 (Mar. 1998).
Siegert et al., *Epitaxial BaTiO₃ . . .*, Mat. Res. Soc. Symp. Proc., vol. 597, pp. 706–711 (2000).
Wong et al., *Pockel's effect . . .*, J. Appl. Phys., vol. 70. No. 3, pp. 1180–1184 (Aug. 1991).
Dogheche et al., *Determination of Optical . . .*, Microelectronics Engineering, vol. 29, pp. 315–318 (1995).
Li et al., *Optical Fiber Communications*, IIIB, edited by I. P. Kaminow, Ch. 8, Academic Press (1997).

* cited by examiner

*Primary Examiner*—David V. Bruce
*Assistant Examiner*—Therese Barber

(57) ABSTRACT

An optical device comprises a body of ferroelectric material exhibiting an effective electro-optic coefficient ($r_{eff}$) and an optical loss ($\alpha$), with the body being adapted for the propagation of optical radiation at a wavelength $\lambda_o$ through it, and means for applying an electric field to the body in order to alter the refractive index therein, characterized in that the body is polycrystalline and has an average grain size such that $r_{eff}$ is relatively high and $\alpha$ is relatively low, both at $\lambda_o$. In a preferred embodiment the body has an average grain size that is less than about $\lambda_o/10$, preferably in the range of approximately 8–20 nm, which is especially well suited for devices operating at near infrared wavelengths in the range of about 1000–1600 nm. Illustratively, the ferroelectric body is a perovskite material such as barium titanate or lithium niobate.

5 Claims, 4 Drawing Sheets

POLYCRYSTALLINE FERROELECTRIC OPTICAL DEVICES

FIELD OF THE INVENTION

This invention relates generally to ferroelectric optical devices and, more particularly, to polycrystalline ferroelectric optical modulators.

BACKGROUND OF THE INVENTION

Ferroelectric perovskite materials are well known for their utility in the optoelectronics art. Single crystal lithium niobate, for example, is used commercially in the design of external electro-optic modulators for laser transmitters. The relatively large electro-optic coefficient of single crystal barium titanate (BTO) makes this material especially well suited to similar applications. See, for example, M. Zgonik et al., *Phys. Rev. B*, Vol. 50, pp. 59415949 (1994), which is incorporated herein by reference. Others have shown that single crystal thin films of BTO with good structural properties can be grown on magnesium oxide (MgO) and other crystalline substrates using well-known pulsed laser deposition (PLD)techniques. See, respectively, L. Beckers etal., *J. AppL. Phys.*, Vol. 83, No. 6, pp. 3305–3310 (1998) and M. Siegert et al., *Mat. Res. Soc. Symp. Proc.*, Vol. 597, pp. 706–711 (2000), both which are also incorporated herein by reference.

It would be desirable to be able integrate this type of modulator into optical integrated circuits (OICs), in particular OICs fabricated using well-known silicon-optical-bench (SiOB) technology. In this technology, silica optical waveguides are formed on a single crystal silicon substrate. These waveguides are capable of guiding optical radiation at wavelengths of about 1100–1550 nm, and the design typically endeavors to minimize the amount of radiation that is coupled into the silicon substrate, which has a much higher refractive index (about 3.5) than that of silica (about 1.5) at these wavelengths. In one design, an epitaxial MgO optical isolation layer is formed on the silicon substrate to reduce the amount of radiation that is coupled into the substrate. One approach to incorporating an electro-optic modulator into this design would be to deposit, for example, single crystal BTO over the MgO layer. See, U.S. Pat. No. 6,103,008 issued to R. A. McKee et al. on Aug. 15, 2000. However, it is difficult to deposit these layers on a silicon substrate. First, to keep optical losses relatively low the MgO and BTO layers are made to be relatively thick. Second, the thermal expansion coefficients of the layers are different from that of the silicon substrate. Third, the layers are deposited at an elevated temperature, and when they are cooled the combination of thick layers and different thermal expansion coefficients conspires to produce significant strain, which in turn causes the layers to crack.

Thus, a need remains in the art for an optical modulator design that would allow ferroelectric electro-optic materials to be more readily integrated into OICs.

One approach might be to replace the electro-optic single crystalline layer with a polycrystalline layer. This design would simplify integration considerably; the deposition temperature could be lowered and the epitaxial isolation layer could be replaced by an amorphous silicon dioxide layer, thereby alleviating the thickness constraints described above. Nevertheless, this approach is fraught with difficulty too-polycrystalline electro-optic materials tend to have disadvantageously high optical scattering in the wavelength regime where the electro-optic coefficient is high. See, for example, B. Wong et al., *J. Appl. Phys.*, Vol. 70, No. 3, pp. 1180–1184 (1991), regarding the Pockel's effect in polycrystalline ZnS planar waveguides and E. Dogheche et al., *Microelectronic Engineering*, Vol. 29, pp. 315–318 (1995) regarding the optical properties of lead-based ferroelectric thin films, both of which are incorporated herein by reference.

SUMMARY OF THE INVENTION

In accordance with one aspect of our invention, an optical device comprises a body of ferroelectric material exhibiting an effective electro-optic coefficient ($r_{eff}$) and an optical loss ($\alpha$), with the body being adapted for the propagation of optical radiation at a wavelength $\lambda_o$ through it, and means for applying an electric field to the body in order to alter the refractive index therein, characterized in that the body is polycrystalline and has an average grain size such that $r_{eff}$ is relatively high and $\alpha$ is relatively low, both at $\lambda_o$. In a preferred embodiment the body has an average grain size that is less than about $\lambda_o/10$, preferably in the range of approximately 8–20 nm, which is especially well suited for devices operating at near infrared wavelengths in the range of about 1000–1600 nm. Illustratively, the ferroelectric body is a perovskite material such as BTO or lithium niobate.

As used herein the term ferroelectric material includes paraelectric materials in which the average grain size is so small that the material does not maintain a spontaneous polarization at zero applied field, yet it does exhibit a significant electro-optic coefficient.

BRIEF DESCRIPTION OF THE DRAWING

Our invention, together with its various features and advantages, can be readily understood from the following more detailed description taken in conjunction with the accompanying drawing, in which.

Figure 1:
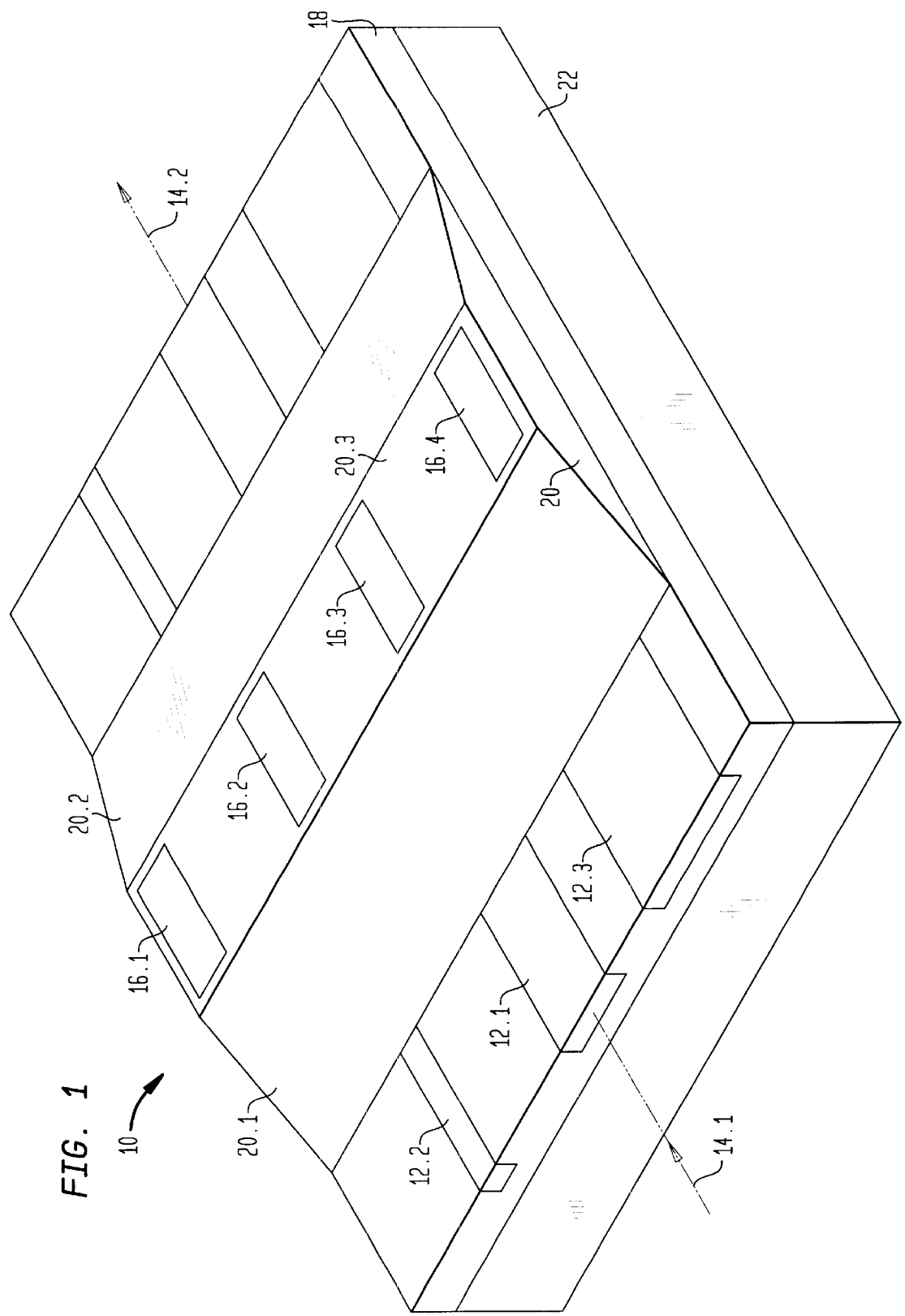
FIG. 1 is a schematic, isometric view of an optical modulator having a multiplicity of waveguides in accordance with one embodiment of our invention.
Figure 2:
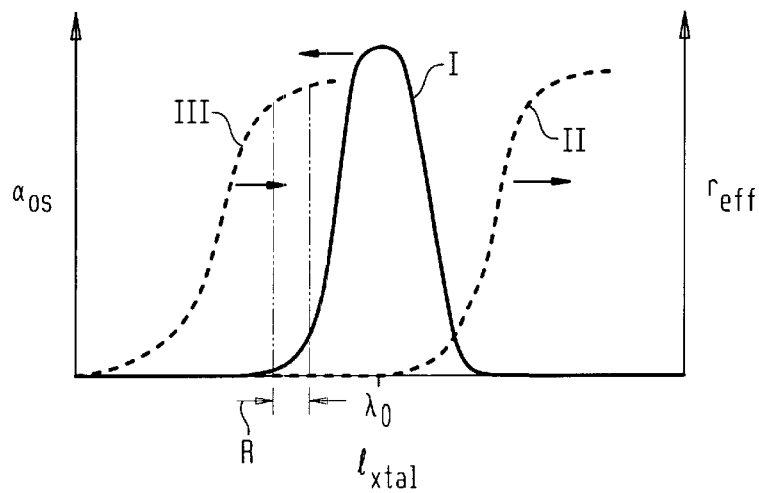
FIG. 2 is a schematic graph of optical scattering loss ($\alpha_{os}$) and effective electro-optic coefficient ($r_{eff}$) as a function of the characteristic dimension $l_{xtal}$ (e.g., average grain size) of a crystal.

In the interest of clarity and simplicity, FIGS. 1 & 2 have not been drawn to scale.

DETAILED DESCRIPTION OF THE INVENTION

General Discussion

With reference now to FIG. 1, an electro-optic modulator 10 comprises at least one integrated optical waveguide 12.1 and a body 20 of polycrystalline ferroelectric material disposed so that at least a portion of the optical radiation propagating in the waveguide is coupled into the body 20. Illustratively, body 20 is formed on top of waveguide 12.1 as a trapezoidal-like prism having a flat top surface 20.3 and slanted or oblique side surfaces 20.1 and 20.2. The latter form tapered optical input and output couplers that facilitate coupling a portion of the radiation in waveguide 12.1 into and out of body 20. Other optical couplers may also be used for this purpose (e.g., well-known lateral waveguide couplers).

An electric field is applied to the body 20 by means of elongated electrodes 16.2 and 16.3, which are located on the top surface 20.3 of body 20 and straddle the underlying waveguide 12.1. This field alters the refractive index of the ferroelectric body and thereby alters or modulates a parameter (e.g., intensity, phase, frequency) of the optical radiation propagating through the modulator. This radiation is illustratively represented by an input optical signal 14.1 to be modulated, which is applied to one end of waveguide 12.1, and by a modulated output optical signal 14.2, which is extracted from the opposite end of waveguide 12.1.

For purposes of illustration, and to demonstrate various aspects of modulator performance discussed later, the modulator 10 is depicted as having three integrated waveguides 12.1 (described above), 12.2 and 12.3 each of different width, with the latter two waveguides being laterally disposed on opposite sides of waveguide 12.2. Fewer than three or more than three waveguides are contemplated by our invention. In conjunction with these waveguides, two additional electrodes 16.1 and 16.4 are disposed on top surface 20.3 of body 20, so that the four electrodes straddle the three waveguides as shown.

In an illustrative embodiment, the modulator includes a substrate 22, a layer 18 formed on the substrate, with the waveguides 12.1, 12.2 and 12.3 being formed in layer 18. In a preferred embodiment, our modulator is constructed using well-known silicon optical bench (SiOB) technology in which substrate 22 is single crystalline silicon, layer 18 is silicon dioxide (silica), waveguides 12.1–12.3 are doped silica, and body 20 is a polycrystalline, ferroelectric material. Preferably the ferroelectric material is a perovskite such as lithium niobate or BTO. An important aspect of our invention is the ability to control the average grain size of polycrystalline body 20 so that, at the wavelength of the input optical signal (e.g., 14.1), it exhibits a relatively high effective electro-optic coefficient $r_{\mathit{eff}}$ while at the same time having relatively low optical optical loss $\alpha$. To better appreciate the significance of this aspect, we turn to FIG. 2, which shows schematically how two parameters, electro-optic coefficient and optical scattering loss $\alpha_{os}$ vary with a characteristic length $l_{xtal}$ (e.g., average grain size) of a crystal. The solid curve I represents the optical scattering loss and exhibits a peak when the characteristic length of the crystal is approximately equal to the wavelength $\lambda_o$ of the optical signal propagating in the crystal (i.e., the crystal exhibits typical Raleigh scattering). In contrast the dashed curves II and III represent the effective electro-optic coefficient. Curve II demonstrates that when $l_{xtal}$ is large relative to $\lambda_o$ there is no regime where $r_{\mathit{eff}}$ is high and simultaneously $\alpha_{os}$ is low. Thus, a modulator designed using such a material would either exhibit effective modulation with unacceptably high loss, or the converse. On the other hand, curve III demonstrates that there is a regime or range R where $l_{xtal}$ is smaller than $\lambda_o$ and where both of the desirable properties simultaneously exist: high $r_{\mathit{eff}}$ and low $\alpha_{os}$. In general, to ensure that a device operates in the latter regime $l_{xtal}$ should be less than about $\lambda_o/10$. Similar principles apply when one considers total optical loss ($\alpha$), which is a combination of optical scattering loss ($\alpha_{os}$) and optical absorption ($\alpha_{oa}$).

In a preferred embodiment of our invention, we believe that this range corresponds to grain sizes of about 8–20 nm for polycrystalline ferroelectric materials at near infrared wavelengths of about 1000–1600 nm, and have specifically demonstrated this to be the case for polycrystalline BTO.

EXAMPLE

This example describes an electro-optic modulator in accordance with one embodiment of our invention in which the waveguide structure is implemented using SiOB technology and the electro-optic modulating material comprises polycrystalline BTO. Various materials, dimensions and operating conditions are provided by way of illustration only and, unless otherwise expressly stated, are not intended to limit the scope of the invention. As used herein, the term undoped means that a particular layer or region is not intentionally doped; i.e., any doping of such a region or layer is relatively low and typically results from residual or background doping in the chamber used to deposit, grow or otherwise form the layers of the device.

Figure 5:
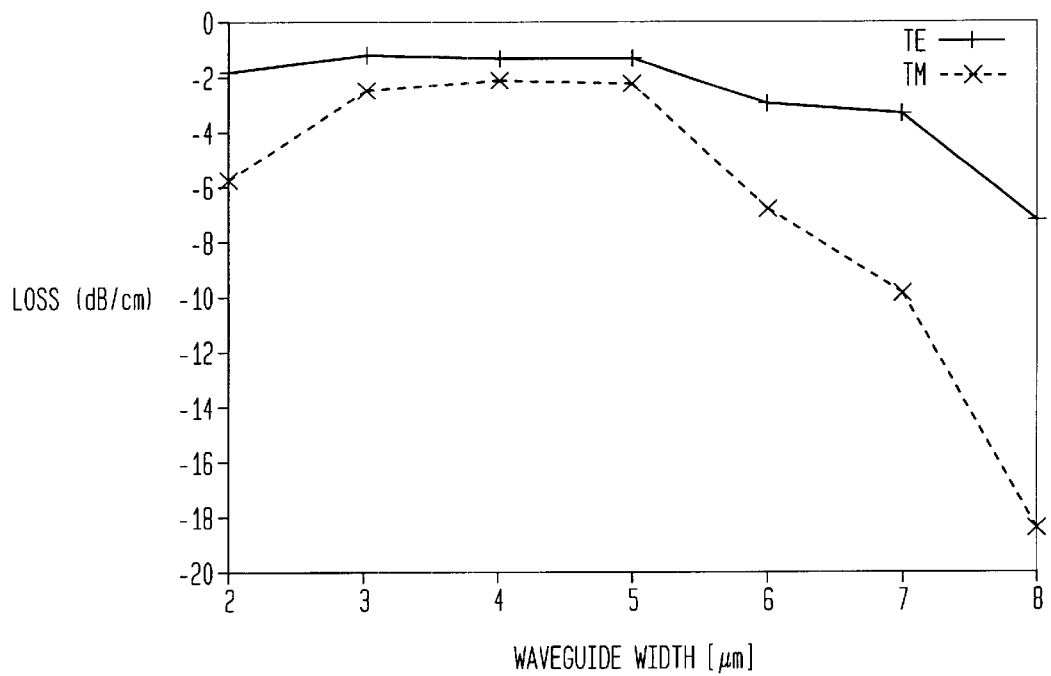
FIG. 5 is a graph of optical loss for both TE and TM modes as a function of waveguide width in an optical modulator of the type depicted in FIG. 1. In this embodiment the polycrystalline BTO layer was 120 nm thick and was deposited at 425° C. on silica waveguides.

As shown in FIG. 1, we used well-known SiOB technology to fabricate the underlying waveguide structure, which included an undoped, silica layer 18 deposited on a single crystal, (100)-oriented, silicon substrate 22 and a multiplicity of doped silica waveguides 12.1–12.3 partially embedded in layer 18. The top, undoped silica cladding layer, which is typical of many SiOB designs, was omitted. The silica layer 18 was about 15 $\mu$m thick and was deposited by well-known high-pressure oxidation (FIPOX). The waveguides 12.1, 12.2 and 12.3 were all about 5 $\mu$m deep, about 2–9 $\mu$m wide (but data for only 2–8 $\mu$m are shown in FIG. 5), respectively, and were all lightly doped with phosphorus. Additional detail on SiOB technology can be found in the literature; see, for example, Y. P. Li et al., *Optical Fiber Communications, IIIB*, edited by I. P. Kaminow et al., Ch. 8, Academic Press (1997), which is incorporated herein by reference.

A polycrystalline BTO layer, shaped into trapezoidal-like prism body 20, was deposited directly onto the top surface of both the silica waveguides 12.1–12.3 and the silica layer 18, which are both amorphous. We used a well-known pulsed laser deposition (PLD) technique to deposit the BTO. More specifically, the substrates were mounted on an inconel plate that was heated by a quartz lamp to temperatures up to 900° C. Prior to deposition, the chamber was evacuated to a pressure of about $10^{-6}$ Pa. After heating up the substrate to the desired growth temperature, an oxygen atmosphere of about 1 Pa was established in the chamber. To effect deposition a KrF excimer laser (e.g., a commercially available Lambda model LPX305) operating at a repetition rate of about 20 Hz was focused onto a sintered disc of BTO. Under these conditions an energy density of approximately 3 J/cm$^2$ was created in the disc. The substrate (i.e., the silicon substrate with silica waveguides thereon) target distance was set to about 7 cm, which resulted in a deposition rate of about 0.4 nm/s.

The oblique surfaces 20.1 and 20.2 of the tapered couplers were realized by covering the ends of the substrate with shadow masks. For our deposition parameters, a substrate-to-shadow-mask distance of about 4 mm generated about 3 mm long ramps. Finally, Cr/Au rectangular electrodes 16-1–16.4 were deposited and patterned using standard deposition, photolithography and lift-off techniques. The electrode dimensions were as follows: inside edge-to-inside edge spacing of about 30 mm; length of about 5 mm; and width of about 50 μm or 100 μm.

We structurally characterized our BTO layers using Rutherford Backscattering Spectrometry (RBS) and x-ray diffraction (XRD). The composition and thickness of the deposited BTO layers were measured with RBS using 2 MeV He$^+$ions. The Ba:Ti ratio was found to be essentially 1:1 within the measurement resolution.

For these measurements, the BTO layers were uniformly about 400 nm thick (no tapered couplers were formed) and were deposited at temperatures ranging from 400° C. to 500° C. These layers were investigated by means of XRD. XRD pole figure studies (not shown) demonstrated that the BTO layers were only weakly textured with a <100> preference.

Figure 3:
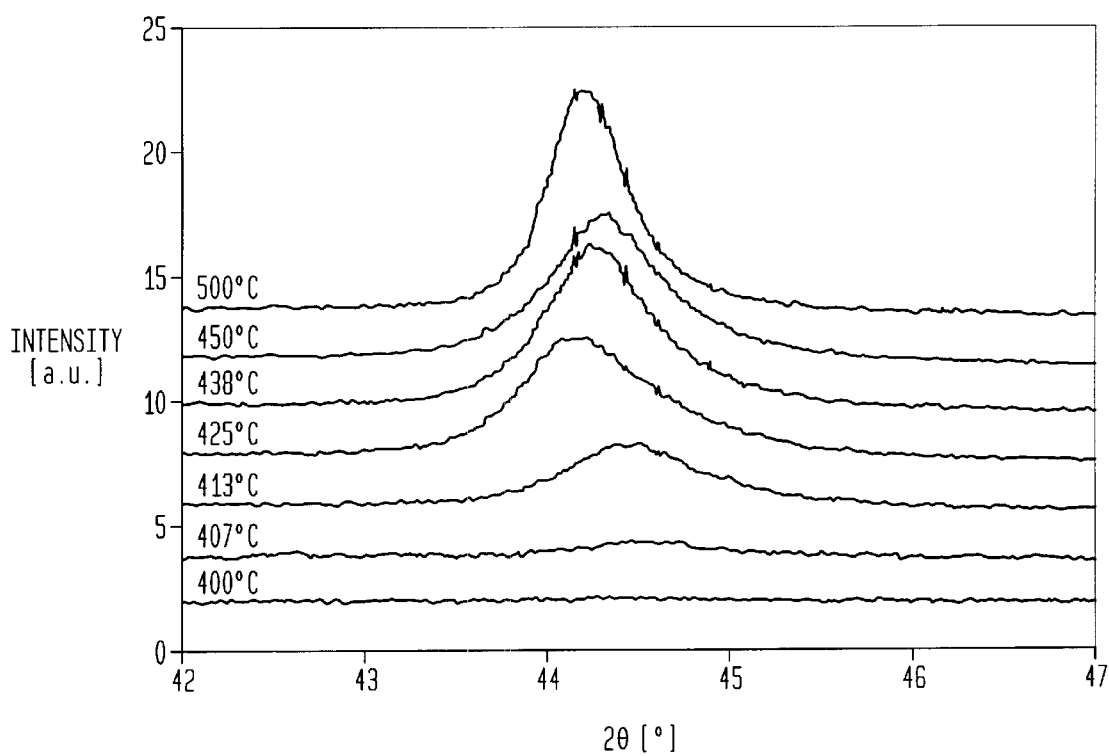
FIG. 3 shows x-ray diffraction (XRD) graphs of polycrystalline BTO films deposited by PLD at various substrate temperatures ranging from 400° C. to 500° C. The (200) peaks are evident.

The (200) peak of the θ-2θ scans is also shown in FIG. 3. The build up and sharpening of these peaks with increasing growth temperature provoked a clearly visible transition from amorphous (about 400° C.) to polycrystalline (above about 413° C.). The FWHM of the peak were determined and the grain sizes were calculated using well-known Scherrer's formula:

$$d=(\kappa\lambda_x/W)\cos\theta \qquad (1)$$

where d is the average grain size of the polycrystalline BTO, κ=0.89 and is a geometric factor, $\lambda_x$ is the x-ray wavelength, W is the width of the (200) peak at FWHM, and θ is the position of the (200) peak. The measured data is shown in the table below:

| TEMP (° C.) | 2θ (°) | W(°) | d (nm) |
|---|---|---|---|
| 500 | 44.23 | 0.48 | 17.73 |
| 450 | 44.33 | 0.46 | 18.50 |
| 438 | 44.29 | 0.69 | 12.23 |
| 425 | 44.23 | 0.84 | 10.13 |
| 413 | 44.48 | 0.87 | 9.78 |
| 400 | — | — | — |

This data shows that average grain sizes of about 9.8 nm to 18.5 nm were realized with PLD growth of polycystalline BTO at temperatures in the range of about 413–500° C. At about 500° C. the grain size reached the resolution limit of our x-ray equipment, but we expect that the average grain size would continue to increase as the temperature is increased above 500° C. This table, and other data not shown, demonstrate an acceptable average grain size range of about 8–20 nm, which is particularly well suited for use in devices that operate at near infrared wavelengths of about 1000–1600 nm.

Figure 4:
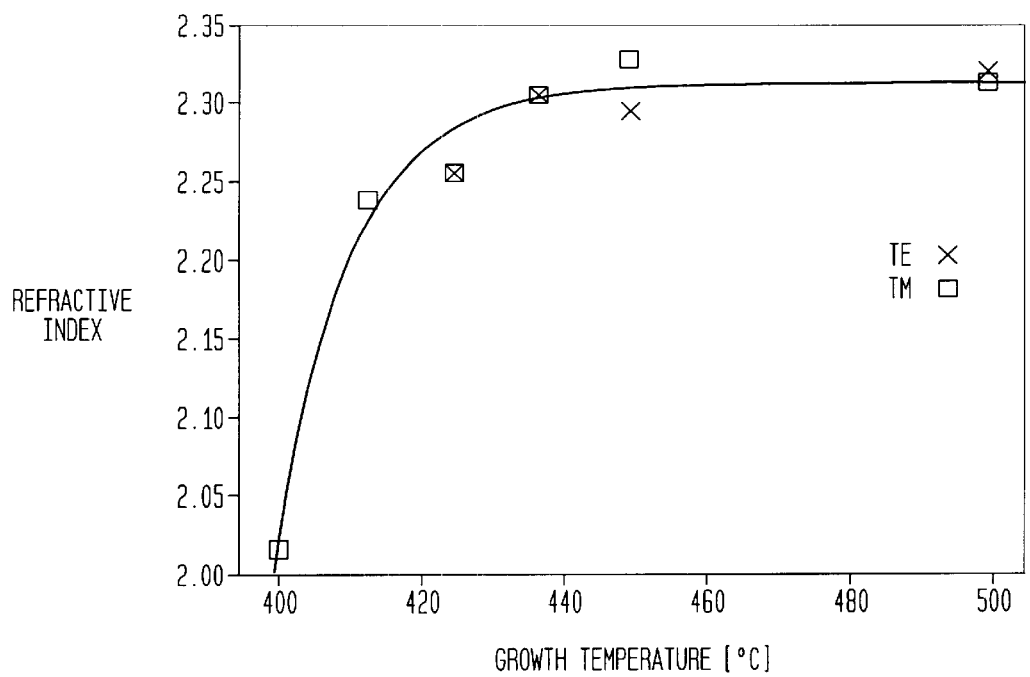
FIG. 4 is a graph of refractive index at a wavelength of about 633 nm for both TE and TM modes versus growth temperature of amorphous and polycrystalline BTO films. The solid line is merely a guide to the eye.
Figure 6:
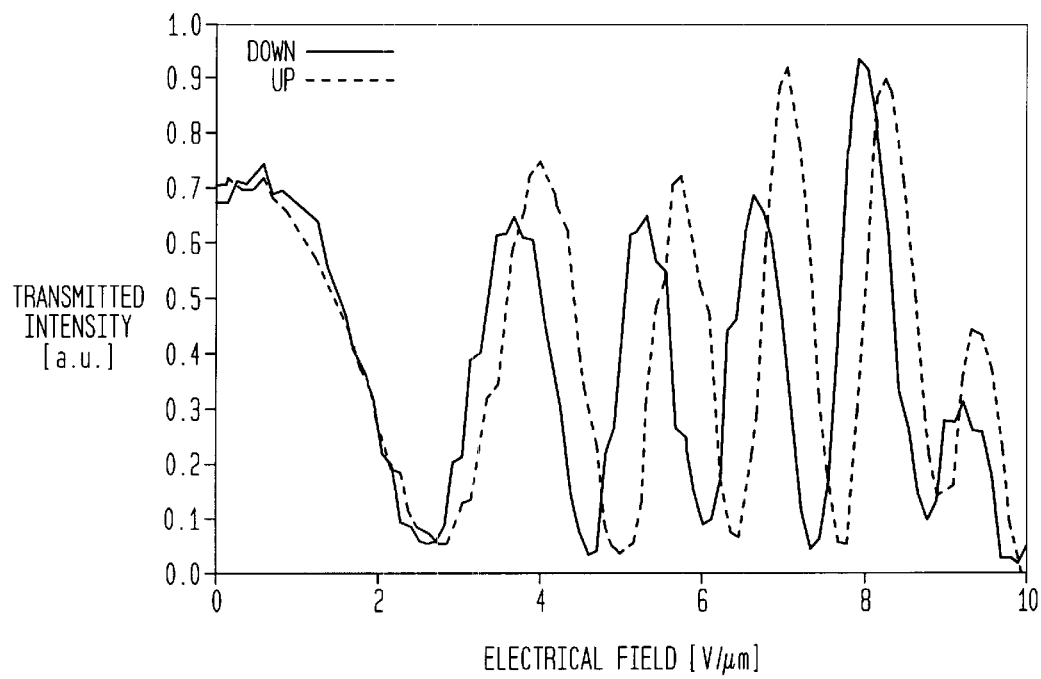
FIG. 6 is a graph showing the response (transmitted optical intensity versus applied electric field) for a modulator of the type described with reference to FIGS. 1 & 5. The response was measured for the lowest loss waveguide (i.e., the waveguide with the best mode field match to the optical fiber that delivered the input optical signal) as the applied electric field was cycled from 300 V down to 0 V and back up to 300 V. The inside edge-to-inside edge electrode spacing was 30 μm.
Figure 7:
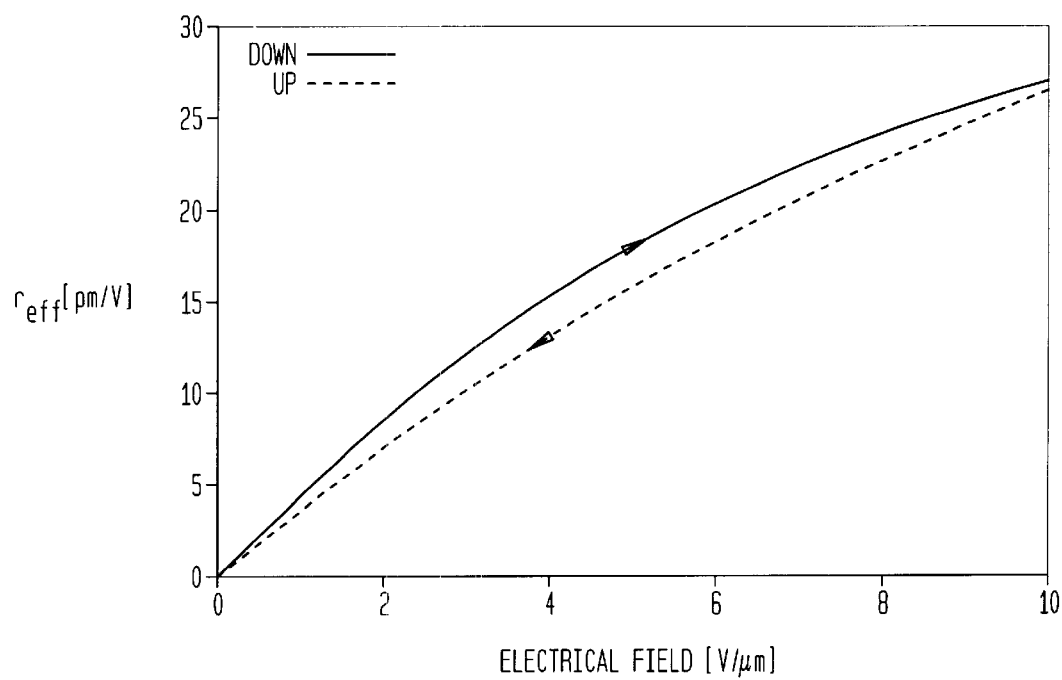
FIG. 7 is a graph showing the effective field-dependent electro-optic coefficient. The solid curve is for increasing electric field; the dashed curve for decreasing electric field.

Optical characterization included measurement of the refractive index of the BTO layers (FIG. 4), the optical loss of these layers (FIG. 5), the modulator response (FIG. 6), and the electro-optic coefficient of the BTO layers (FIG. 7). More specifically, the refractive index and thickness of the BTO layers were measured at a wavelength of about 633 nm using a prism set up of the type described by L. Beckers et al, supra. The results are shown in FIG. 4. For samples grown at about 400° C. and about 413° C., only the TM modes could be measured. The amorphous sample grown at about 400° C. exhibited a refractive index of only about 2.0, but the index increased at higher growth temperatures where the layers became polycrystalline: at about 413° C. the index was about 2.25 and at about 450° C. is was above about 2.3 (nearly the value of bulk BTO single crystalline material; ie., 2.41 and 2.36 for ordinary and extraordinary rays, respectively). This trend of increasing index with increasing temperature corresponds to increasing average grain size with increasing temperature.

Next, a simple loss measurement was performed. The 1.54 μm output from a fiber-coupled diode laser was butt-coupled from a 5 μm core standard fiber into and out of each of the modulator waveguides (e.g., 12.1–12.3, although in this case the device had 7 waveguides with widths of 2, 3, 4, 5, 6, 7 and 8 μm). The input tapered coupler coupled a portion of the input signal 14.1 into the BTO body 20 due, in part, to the fact that it has a higher refractive index (2.3) than that of the underlying silica waveguide (1.5). Then the signal propagated through the body 20 being guided by the underlying silica waveguide (like a strip-loaded waveguide). The output tapered coupler coupled the signal back into the silica waveguide 12.1 where it emerged as output signal 14.2. The optical intensity of output signal 14.2 was measured with a fiber power meter. Zero dB was calibrated to the intensity delivered when the fibers were butt-coupled to one another (i.e., there was no silica waveguide between them). FIG. 5 shows the measured optical loss as a function of silica waveguide width ranging from 2–8 μm. The BTO layer overlying all 7 of these waveguides was about 120 nm thick in its flat central section and was deposited at about 425° C. The length of the tapered couplers (i.e., the length of the slanted surfaces 20.1 and 20.2 shown in FIG. 1) was about 3 mm. The minimum loss, about −1.5 dB for TE modes and about −2.5 dB for TM modes, was achieved for waveguide widths of 3–5 μm, which had the best mode field match to the optical fiber that delivered the input optical signal to the modulator. Below this range (i.e., for 2 μm wide waveguides) the optical loss was dominated by radiation lost in coupling from the input fiber to the silica waveguide, whereas above this range (ie., for 3–9 μm wide waveguides) the optical loss was dominated by radiation lost in coupling from the silica waveguide to the output fiber.

For BTO layers thicker than about 150 nm, the underlying silica waveguide guides the optical signal too weakly to ensure low loss propagation through the device; i.e., the signal is scattered into adjoining waveguides. Thicker BTO layers could be realized by forming a shallow BTO rib on the BTO layer and over the underlying silica waveguide, a design that is akin to well-know ridge waveguide structures. In this embodiment we expect the loss to be reduced to less than about 1 dB/cm due to the reduced surface scattering.

In order to make electro-optic measurements on our modulator, we used the following set up (not shown): the optical input signal to one of the silica waveguides was delivered by a 1.54 μm semiconductor diode laser. The output of the laser was passed through a fiber polarizer in order to adjust the polarization of the input signal to be about 45° with respect to the normal to the top surface of the modulator. Thus, both the TE and TM modes were launched in phase and with essentially equal intensities into the waveguide. However, the different propagation constants of these modes resulted in a phase difference between them at the output end of the waveguide. Consequently, the output signal was elliptically polarized. This optical output signal was focused by a microscope lens, passed through a polarizer set at about −45°, and made incident on a photodetector. As the electric field applied to the modulator was changed, the refractive indices of both modes also changed, but by different amounts, which meant that phase difference between the modes also changed. When the phase difference was equal to 0 or π, the intensity at the photodetector was a minimum or a maximum, where the phase difference Γ is given by:

$$\Gamma = \Gamma_o - (\pi/\lambda_o)(r_{TE} n_{TE}^3 - r_{TM} n_{TM}^3) E L_e \quad (2)$$

where $\Gamma_o = k_o (n_{TE} - n_{TM}) L_d$ is the phase difference without an applied field, $k_o = 2\pi/\lambda_o$ is the propagation constant, $\lambda_o$ is the center wavelength of the input optical signal, $n_{TE}$ and $n_{TM}$ are the refractive indices of the TE and TM modes, respectively, $L_d$ is the physical length of the modulator measured from input to output, $L_e$ is the length of the electrodes measured in the direction of signal propagation, and E is the amplitude of the applied electric field.

With our experimental set up it was not possible to measure $r_{TE}$ and $r_{TM}$ independently, but we were able to measure an effective electro-optic coefficient $r_{eff}$ given by:

$$r_{eff} = r_{TE} - n_{TM}^3 / n_{TM}^3 r_{TM} \quad (3)$$

The response of the modulator was taken in the following manner: Prior to the measurement, the BTO layer was poled for several minutes at 300 V resulting in an electric field of 10 V/cm. After the poling was completed, the voltage was gradually lowered down to 0 V in 91 steps each 100 ms long. We refer to this process as a downward scan. Then the voltage was step-wise increased to 300 V again in the same fashion. We refer to this as an upward scan. The resulting intensity of the output optical signal was measured and the transmitted intensity was plotted versus electric field for both scans, as shown in FIG. 6. For these measurements the length of the electrodes was about 5 mm and their inside edge-to-inside edge spacing was about 30 μm.

FIG. 6 also demonstrates that the modulator exhibited hysteretic behavior; i.e., the curve for the downward scan (solid line) is shifted with respect to the curve for the upward scan (dashed line). Significantly, both scans clearly show a quadratic behavior at low to intermediate fields of less than about 5 V/μm. Only at relatively high fields of about 5–10 V/μm did we observe a linear electro-optic effect. This effect could be explained by the loss of net poling at low electric fields. It is very likely that the crystallites are too small to sustain a remnant polarization. Without an external field no internal polarization remains. An external field creates a polarization and the electro-optic effect becomes visible. The effective electro-optic coefficients are plotted in FIG. 7 for both scans.

At fields of approximately 8 V/μm an effective electro-optic coefficient in excess of about 20 pm/V (e.g., $r_{eff} \approx 24$ pm/V) was achieved at an optical loss below about 1.5 dB (e.g., 1.4 dB), which is extremely attractive especially when combined with the advantages of being able to build a modulator with polycrystalline material.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, although we have focused on modulator applications, it will be apparent that other optical devices (e.g., tunable attenuators, optical switches, tunable couplers, and poled ferroelectrics for frequency shifters) could benefit from the use of polycrystalline, ferroelectric materials in their design.

What is claimed is:

1. An optical device comprising
   a body of ferroelectric material adapted for the propagation of optical radiation in at least a region thereof,
   means for applying an electric field to said region in order to alter the refractive index therein, characterized in that,
   said region comprises polycrystalline BTO and has an average grain size in the range of approximately 8–20 nm.

2. The invention of claim 1 wherein said device comprises an electro-optic modulator.

3. The invention of claim 1 wherein said device includes an integrated optical waveguide in which said radiation propagates and said region is disposed adjacent at least a portion of said waveguide.

4. The invention of claim 3 wherein said device includes a substrate in which said waveguide is formed, said body overlays said waveguide, and said body includes a first coupler for coupling at least a portion of said radiation from said waveguide into said region where a parameter of said radiation is altered upon the application of said electric field, and a second coupler for coupling said radiation portion from said region back into said waveguide.

5. An electro-optic modulator comprising
   a silica optical waveguide adapted for the propagation of optical radiation at a wavelength of approximately 1000–1600 nm therein,
   a body of ferroelectric BTO material exhibiting an effective electro-optic coefficient ($r_{eff}$) and an optical loss (α),
   optical couplers for coupling radiation to and from said waveguide into and out of said body, and
   electrodes for applying an electric field to said body in order to alter the refractive index therein, characterized in that
   said body is polycrystalline and has an average grain size of approximately 8–20 nm so that at said wavelength $r_{eff}$ is at least about 20 pm/V and the optical loss in said waveguide is less than about 1.4 dB/cm.

* * * * *